June 25, 1968    R. M. WISE    3,389,626
METHOD AND APPARATUS FOR AWLING TIRES
Filed April 5, 1966    8 Sheets-Sheet 1

INVENTOR
RALPH M. WISE
BY Steward & Steward
his ATTORNEYS.

INVENTOR
RALPH M. WISE
BY Steward & Steward
his ATTORNEYS.

June 25, 1968  R. M. WISE  3,389,626

METHOD AND APPARATUS FOR AWLING TIRES

Filed April 5, 1966  8 Sheets-Sheet 6

INVENTOR
RALPH M. WISE
BY Steward & Steward
his ATTORNEYS.

1

3,389,626
METHOD AND APPARATUS FOR AWLING TIRES
Ralph M. Wise, Milford, Conn., assignor to The Armstrong Rubber Company, West Haven, Conn., a corporation of Connecticut
Filed Apr. 5, 1966, Ser. No. 540,292
16 Claims. (Cl. 83—2)

ABSTRACT OF THE DISCLOSURE

A method and apparatus for awling pneumatic tires in which the tires are clamped to an awling platform by several hook-shaped members which move into the center of the tire and then outwardly against the bead, gripping it at several places therealong. These clamping members act as positioning guides for a plurality of awls that are disposed about the central axis of the platform and mounted independently of the clamping members for movement radially outward into engagement therewith for locating the awls at the proper position radially of the tire. The awls are then operated in order to perforate the tire. In addition the awls are mounted for rotary movement about the central axis so that after one set of perforations have been made in the tire, the awls are shifted a predetermined distance about said axis and operated again in order to form another set of perforations. When the desired number of perforations have been made in one side of the tire in this step-by-step fashion, the tire may be turned over on the platform in order to awl the opposite side.

---

This invention relates to the perforating or awling of pneumatic tires in order to vent air which may seep along the cords of the tire when in use, in what is commonly referred to in the tire industry as "wicking."

It is now common practice to perforate pneumatic tires in the bead area of the sidewall in order to prevent the formation of air pockets between the cord plies and layers of rubber. In the case of tubeless tires, the perforations are made only partially through the wall of the tire, as shown for example in my prior Patents Nos. 3,109,337 and 3,109,338, while in tube-type tires, and especially in truck tires, it is sometimes desirable to drive the awls completely through the wall of the tire. It has also been found desirable in many cases to provide a greater number of vent holes in each side of the tire than have been made heretofore. However, due to the lack of space within which to work, presently available tire-awling machines have been limited insofar as concerns the number of holes which they can make in one tire, the space available for the awls and operating mechanism therefor being determined by the diameter of the tire. Consequently, in order to accommodate some standard tire sizes, it is necessary to crowd the awls into an area which is only slightly more than a foot in diameter. Even with tires of larger dameters, it is difficult to provide enough awls to form the desired number of venting holes in each tire, because the larger tires usually require more holes.

It is accordingly an object of the present invention to provide a method and apparatus for automatically awling pneumatic tires for automobiles, trucks and the like, whereby a large number of holes can be formed rapidly in a finished tire at spaced intervals adjacent the bead of the tire. Another object is to provide a machine which is safe to operate, requires a minimum of attention, both to run and maintain, and can be relied upon to operate continuously for relatively long periods of time without a break-down or malfunction. Still another object of the invention is to provide a tire-awling machine which is capable of handling tires in a wide range of sizes.

Apparatus embodying the invention includes an awling platform, which is preferably disposed horizontally, but which may be arranged vertically if desired. In either case the tires are delivered one at a time to the awling platform and centered on it with one side contacting it. Several clamping members are provided at the center of the awling platform for gripping a tire by its bead when it is centered on the awling platform. The clamping members are arranged so that when a tire is in place, they move axially into the central opening in the tire, radially outward against the inner-edge or bead-portion of the tire, and then back against the platform so as to clamp the bead of the tire to the awling platform. A plurality of awls are mounted in spaced relation about the center of the awling machine for radial movement into and out of engagement with the clamping members, so that they are positioned radially of the tire by said clamping members in order to form perforations in the tire at the desired places radially of the bead.

Another important aspect of the invention resides in mounting the awls so that they can be rotated as a unit about the center of the tire in order to progressively awl the tire along its side wall. In this way any number of perforations may be made in the side of the tire by using only a few awls which are shifted about the tire between each awling operation, thereby eliminating the necessity of providing a large number of awls. For example, it is possible to rapidly awl eighteen perforations in one side of a tire, using only six awls which are indexed to three different positions along the sidewall of the tire. While the apparatus specifically disclosed hereinafter for illustrative purposes inverts the tire in order to perforate it on both sides on the same awling platform, it will be appreciated that both the method and apparatus embodying the invention may be employed by perforating opposite sides of the tire simultaneously. This may be accomplished, for example, by providing awling platforms on both sides of the tire, in which event it would be desirable to move at least one of the awling platforms bodily into and out of engagement with the tire. An arrangement such as this would double the capacity of the awling machine.

Additional objects and advantages of the invention will become more apparent from the description hereinafter of the best mode presently known for carrying out the invention, reference being made to the accompanying drawings wherein.

Figure 1:
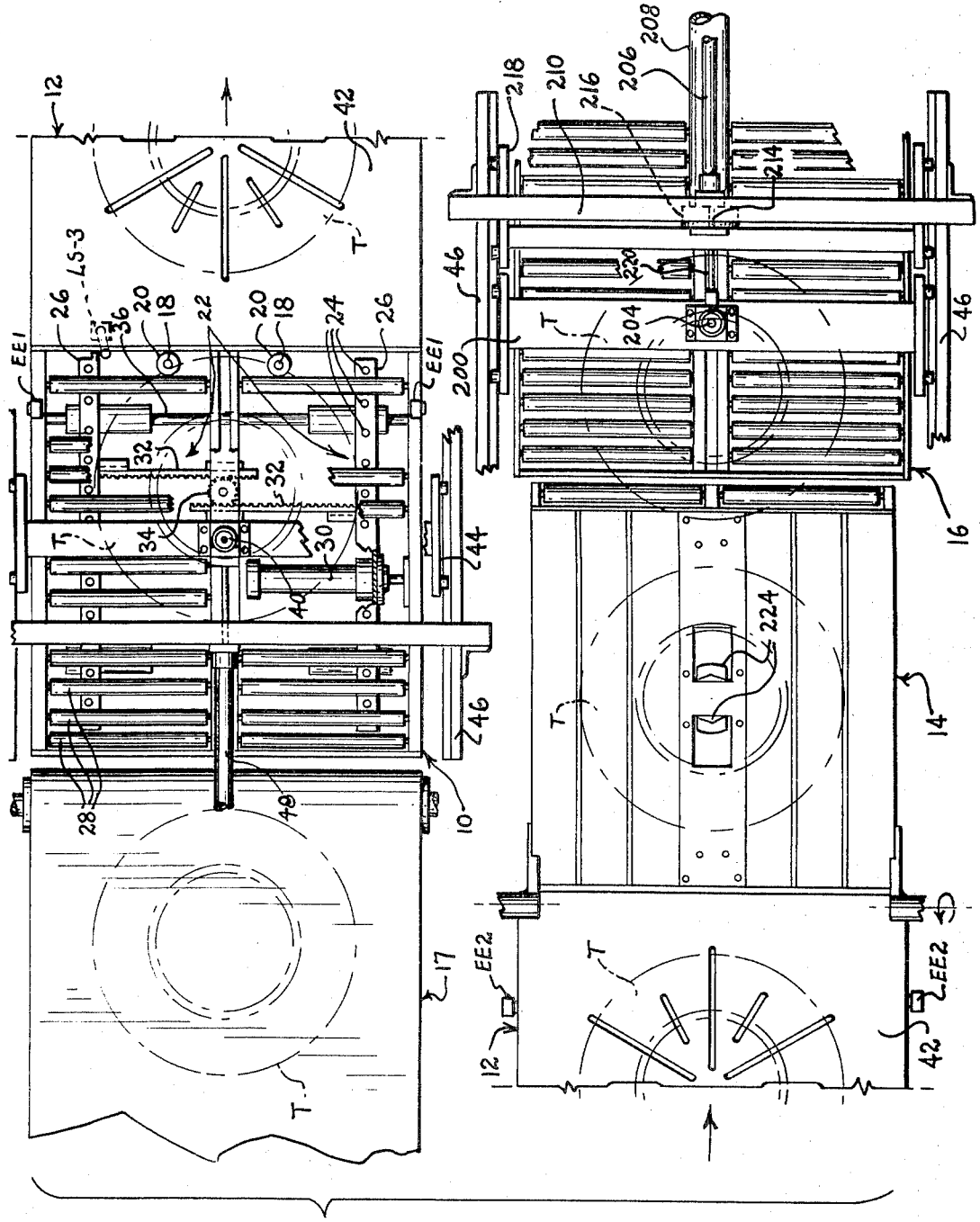
FIG. 1 is a plan view of an installation in which the awling machine of the present invention may be employed, portions of the system being shown more or less diagrammatically and parts of the feed and take-away conveyors being broken away in order to expose parts below.
Figure 2:
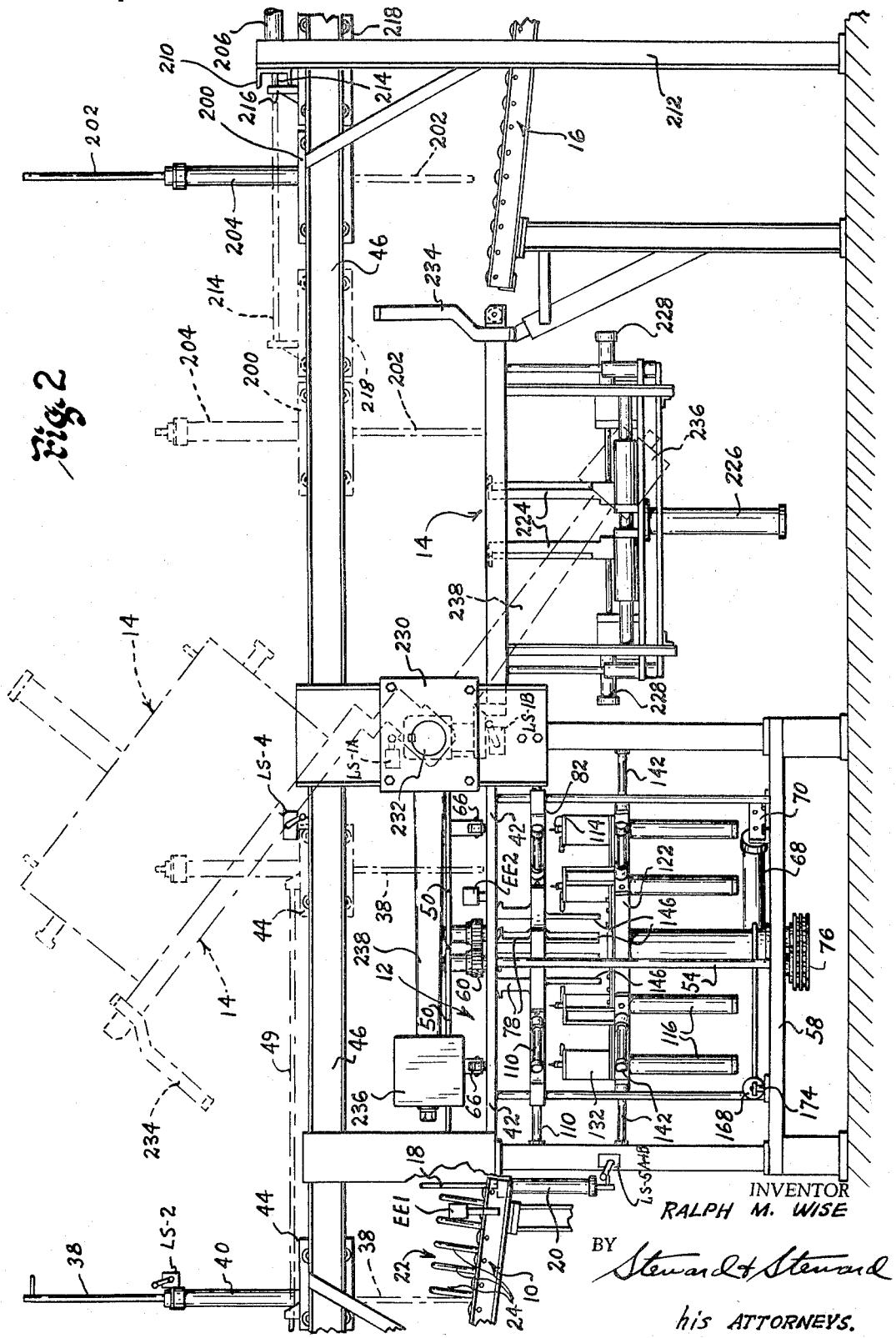
FIG. 2 is a longitudinal elevational view showing portions of the installation of FIG. 1 in greater detail.

Referring to FIGS. 1 and 2, the tires T are fed horizontally by a roller ramp 10 to the awling machine 12, onto which they are pushed one-by-one. Each tire rests on its side in the awling machine, where it is gripped and awled on its underside, then released and moved horizontally, still on its side, to an inverting table 14. The inverting table 14 grips the tire and swings it counterclockwise up and back, as indicated in broken lines in FIG. 2, depositing the tire a second time on the awling machine 12, but with its unperforated side down. As the inverting table returns clockwise to its normal tire-receiving position, the tire which has just been awled on one side is again gripped and awled on the other. After being released it is finally drawn completely across the inverting table to a take-away ramp 16, which carries it away from the awling machine.

Since the present invention relates more particularly to the actual awling operation, only such reference is made herein to the feed and take-away systems and to the tire inverting mechanism as is necessary to an understanding of one way in which the present awling machine may be employed in order to perforate both sides of a tire. As indicated above the awling machine 12 in this instance perforates only one side of a tire at a time, the awling operations being identical on both sides of the tire.

When a tire slides down the inclined roller ramp 10, it breaks a light beam to a photoelectric control relay EE1 which stops a feed conveyor 17 in order to temporarily stop the next tire approaching the awling machine. The tire on the ramp 10 is prevented from immediately entering the awling machine 12 by a pair of stop rods 18, 18, which extend upwardly at the end of ramp 10 from a pair of pneumatic cylinders 20, 20 mounted vertically underneath ramp 10. At the same time, a centering device 22 on ramp 10 is actuated in order to center the tire transversely thereof, so that it will enter the awling machine correctly.

The centering device 22 consists of two rows of vertical posts 24 mounted on slide bars 26 (FIG. 1) on opposite sides of ramp 10. Slide bars 26 move inwardly toward each other transversely of the ramp, with centering posts 24 projecting upward between the rollers 28 thereof. A pneumatic power cylinder 30 mounted on one of the slide bars 26 and having its piston rod connected to the side of ramp 10 moves the slide bars 26 toward and away from each other, slide bars 26 being operatively interconnected by a pair of racks 32, 32, which mesh with an idler gear 34 at the center of the ramp. Racks 32, 32 and gear 34 are disposed below rollers 28 so that they do not interfere with the tires carried on the ramp. A pair of rods 36 disposed transversely of ramp 10 are mounted at their ends on opposite sides thereof and are spaced from each other longitudinally of the ramp, slide bars 26, 26 being slidingly supported on rods 36 for movement toward the center of the ramp.

As the centering device 12 moves the tire toward the center of ramp 10, a limit switch LS–3 is momentarily closed, causing a push rod 38 to be lowered by its pneumatic cylinder 40 into the center of the tire on ramp 10. When push rod 38 is all the way down, it opens a limit switch LS–2, retracting stop rods 18, 18 downwardly, so that the tire can be pushed onto the awling platform 42 of the awling machine 12. Retraction of stop rods 18 causes the centering device 22 on ramp 10 to move away from the tire and at the same time starts the forward or feeding stroke of push rod 38 from its fullline position as shown in FIG. 1 and 2 to its broken-line position. As push rod 38 moves forward across the awling platform 42, it carries the tire on ramp 10 with it into the awling machine.

The push rod 38 and its retracting cylinder 40 are mounted on a feed carriage 44 which rides on horizontal tracks 46 extending continuously from above ramp 10 at least across a substantial portion of take-away ramp 16. A horizontal power cylinder 48 mounted on a fixed portion of the framework supporting tracks 46 has its piston rod connected to carriage 44 for shoving push rod 38 across the awling platform 42 and back. As feed carriage 44 reaches the end of its feeding stroke, it opens a limit switch LS–4 which raises the push rod 38 out of the tire opening and reverses the feed cylinder 48, in order to return push rod 38 to its starting position over roller ramp 10. As the push rod 38 is lifted to its retracted position by cylinder 40, it permits limit switch LS–2 to close again raising the stop rods 18, 18 so that the next tire to enter the machine will stop on ramp 10 and be centered before it proceeds.

Figure 3:
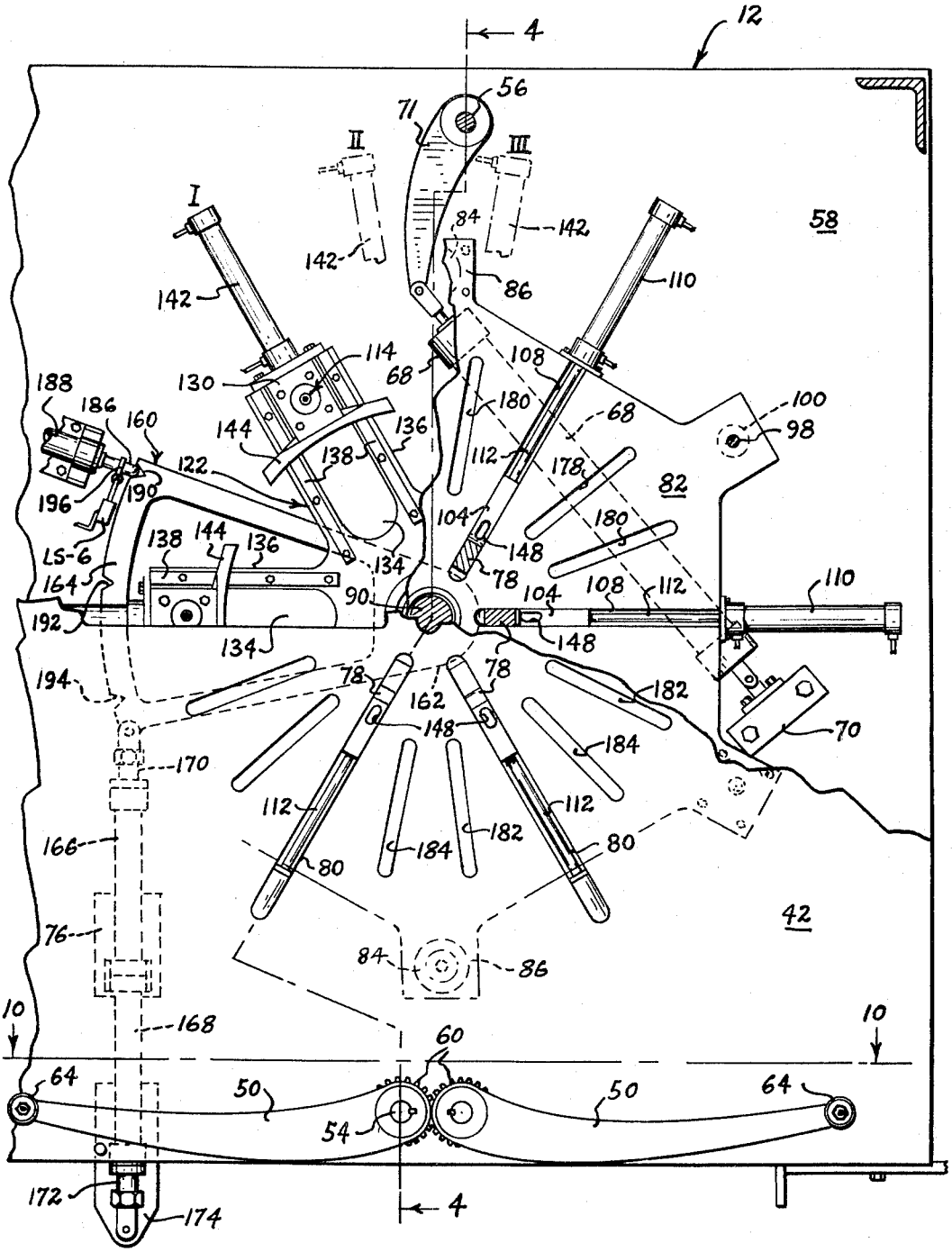
FIG. 3 is a plan view of the awling machine, with parts of the awling platform and of the tire-clamp mounting plate shown broken away in order to expose the structure below.

The tire just pushed onto the awling platform 42 breaks a light beam to a photoelectric control relay EE2, which starts a timer for sequencing the awling operations The tire is first centered on platform 42 by means of two pairs of centering arms located on top of platform 42, one pair 50, 50 (FIGS. 2–4) being mounted on one side of platform 42, while the other pair 52, 52 (FIG. 4) is mounted on the opposite side of the awling platform, so that when they are fully retracted as shown in FIG. 3, they do not interfere with the movement of a tire onto and off the awling platform. Each pair of centering arms 50 and 52 is pivoted centrally of the awling platform in the longitudinal direction, that is, in the direction in which the tire moves onto the awling machine. One of each pair of centering arms 50 and 52 is mounted on a drive shaft 54 and 56, respectively, each of which extends down through the awling platform 42 and a bottom plate 58 at the base of the awling machine. Drive shafts 54 and 56 are suitably journaled in bearings mounted in platform 42 and bottom plate 58.

Figure 10:
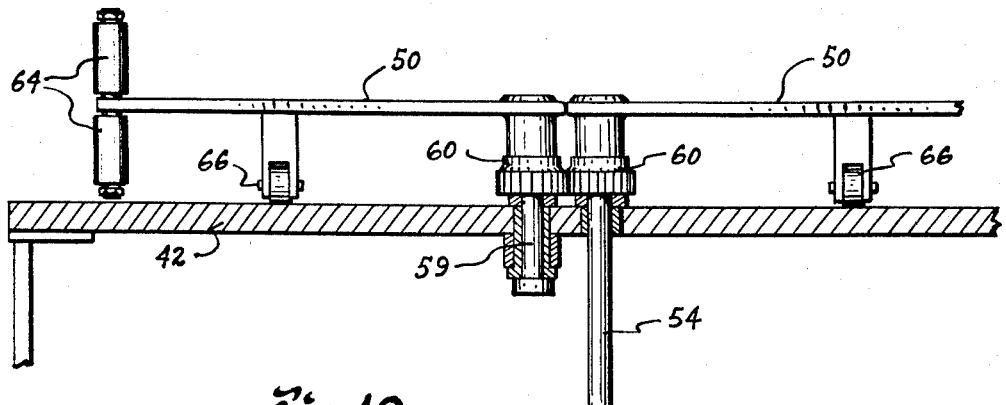
FIG. 10 is a vertical view of the centering arms taken on the line 10—10 of FIG. 3.

The other arm in each pair of centering arms 50 and 52 is pivoted on a stub shaft 59 (FIG. 10) journaled on the awling platform 42 immediately adjacent drive shafts 54 and 56, respectively, and is driven thereby through pairs of gears 60 and 62, respectively, which are fixed with respect to the centering arms 50 and 52, so that upon rotation of drive shafts 54 and 56, arms 50 and 52 will swing inwardly from their inoperative positions shown in FIG. 3. As shown in FIG. 10, the outer end of each centering arm 50, 52 is provided with vertically disposed rollers 64 which engage the tread of the tire and center it on platform 42. Caster wheels 66 are mounted near the middle of each centering arm for engagement with the upper surface of platform 42, in order to support the outer ends of the arms. Centering arms 50, 52 are actuated by a pneumatic cylinder 68 (FIG. 3), which is pivoted at one end to a mounting block 70 bolted to the upper side of bottom plate 58. The piston rod of cylinder 68 is connected to the outer end of a crank arm 71 fixed to drive shaft 56 for centering arms 52.

The lower ends of drive shafts 54 and 56 extend through bottom plate 58 and are provided on the underside thereof with drive sprockets 72 and 74 (FIG. 4), which are interconnected by a drive chain 76. When cylinder 68 is extended, it pivots drive shaft 56 clockwise, as viewed in FIG. 3, causing centering arms 52, 52 to swing inwardly into engagement with the periphery of the tire. At the same time, drive shaft 56 rotates shaft 54 in like manner through chain 76 to swing centering arms 50, 50 into engagement with the other side of the tire, thereby positively centering the tire on the awling platform.

Once centered, the tire is gripped by a set of six clamping dogs 78 located below the awling platform 42 and spaced equally about its center. Dogs 78 are projectable upwardly through radial slots 80 in platform 42 into clamping engagement with the lower bead of the tire. The clamping mechanism is similar to that shown in my above-mentioned patents, dogs 78 being carried by a generally hexagonal mounting plate 82 located underneath the awling platform 42 and vertically reciprocable in response to a pair of elevating cylinders 84 (FIG. 4) bolted on the underside of plate 82 to mounting projections 86 at diametrically opposite points on the periphery thereof. The piston rods of cylinders 84 extend freely through openings 88 in mounting plate 82 into threaded connection with awling platform 42, so that when cylinders 84 are actuated in one direction they lift mounting plate 82 upward into juxtaposition with awling platform 42 in order to project clamping dogs 78 into the center of the tire.

Mounting plate 82 is supported at its center on a vertical center post 90, with which it is slidably engaged for vertical reciprocal movement. Center post 90 is rigidly fixed at its opposite ends to awling platform 42 and bottom plate 58, respectively. A booster spring 92 is compressed between the underside of mounting plate 82 and the upper race of a thrust bearing 94 at the top of an elongated sleeve 96 surrounding the lower half of center post 90. Booster spring 92 supports the clamping-dog mounting plate 82 at its center and assists elevating cylinders 84 in raising the clamping dogs simultaneously into the opening of the tire. Mounting plate 82 is further guided at each of its other four corners by guide rods 98, which are fixed to platform 42 and extend vertically down through guide bushings 100 mounted on the underside of mounting plate 82.

Figure 4:
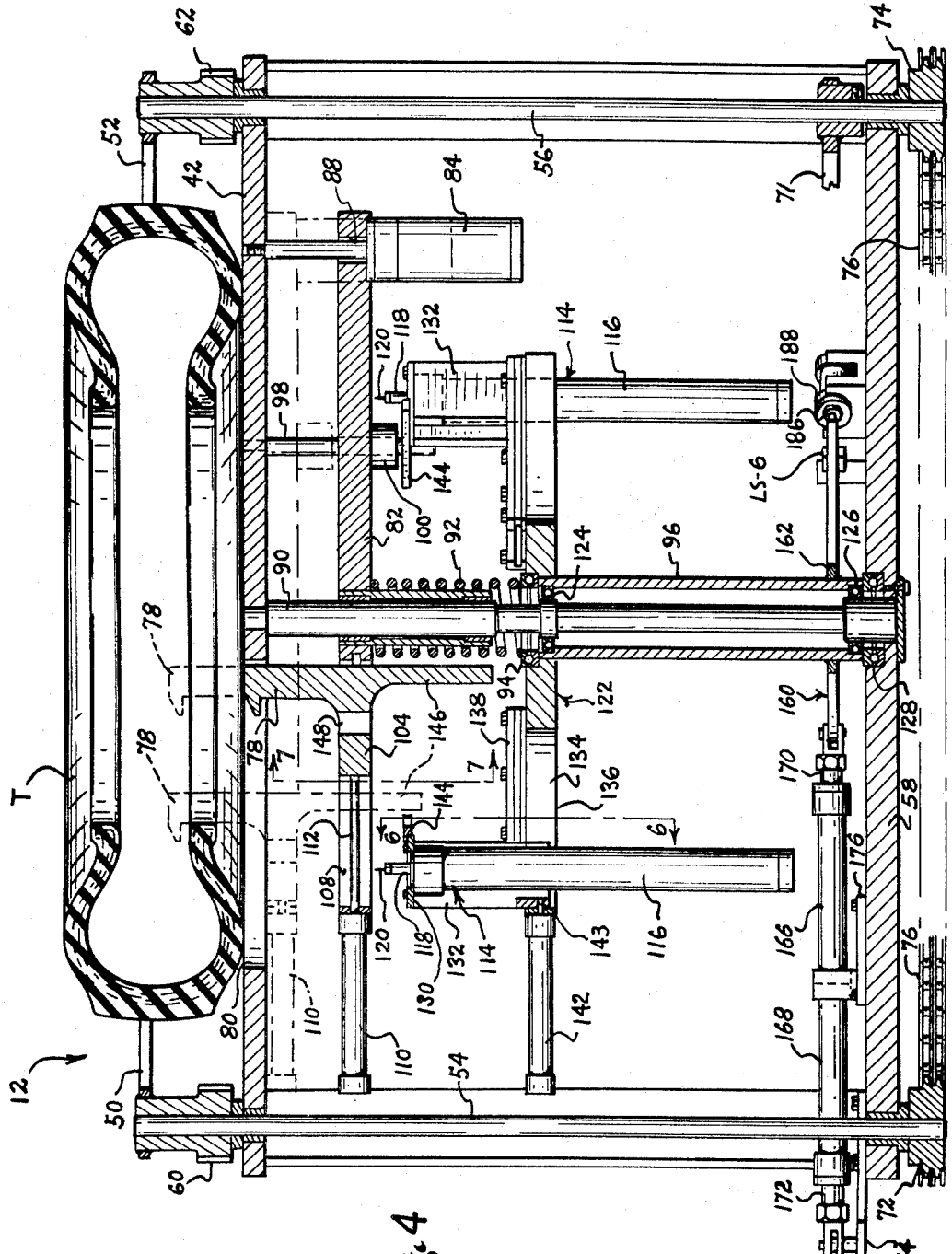
FIG. 4 is a vertical section through the awling machine, taken on the line 4—4 in FIG. 3 and looking in the direction of the arrows, a tire being shown in position to be awled.
Figure 5:
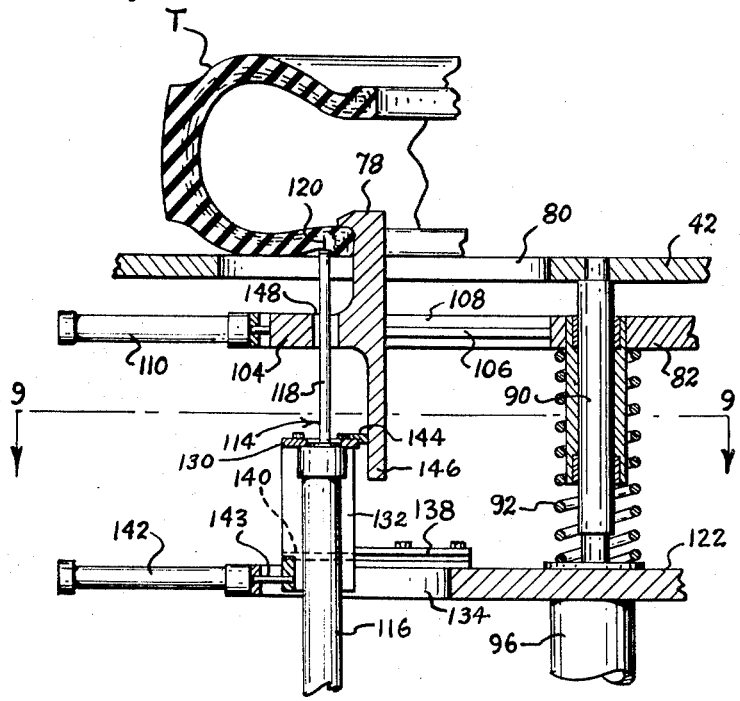
FIG. 5 is a view similar to FIG. 4, but showing only a portion of the awling machine during an awling operation.
Figure 7:
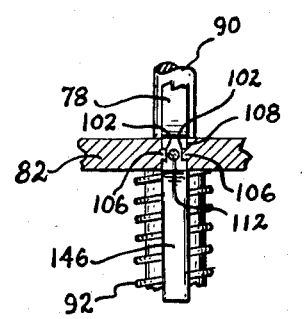
FIG. 7 is another elevational view partly in section taken on the line 7—7 in FIG. 4, showing one of the tire clamping dogs and the manner in which it is mounted.
Figure 6:
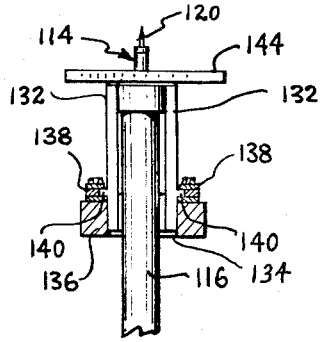
FIG. 6 is an elevational view taken on line 6—6 of FIG. 4 and partly in section of one of the awling cylinders, and showing the manner in which it is mounted.

As may be seen in FIGS. 4, 5 and 7, clamping dogs 78 are slidably movable on mounting plate 82 in a radial direction, each dog 78 having horizontal grooves 102, 102 on opposite sides of its base portion 104, permitting it to slide along tongues 106, 106 formed in the sides of a radial slot 108 in mounting plate 82, which extends out to the edge thereof. In their uppermost position clamping dogs 78 extend above the lower bead of the tire as it lies on the awling platform 42. After the dogs 78 have reached this uppermost position, they are moved radially outward against the inner edge of the tire, all as indicated in the broken-line positions of the dog 78 shown in FIG. 4.

Radial movement of the clamping dogs is effected by power cylinders 110, one for each of the six clamping dogs employed in this particular construction. Each cylinder 110 is mounted radially at an outer edge of mounting plate 82 in line with each slot 108. The piston rods 112 for power cylinders 110 are each threaded to the outer end of the base portion 104 of the corresponding clamping dog, so that extension or retraction of piston rods 112 slides the dogs 78 radially along slots 108. After the clamping dogs 78 have been moved outward against the lower bead of the tire, the elevating cylinders 84 are reversed, lowering the mounting plate 82 and causing the clamping dogs 78 to clamp the lower bead and sidewall of the tire against the awling platform 42, as shown in FIG. 5.

When the tire is firmly clamped to the awling platform 42, it is ready to be awled. This is accomplished by a plurality (in this case six) of power-operated awls 114 equally spaced about the center post 90 and below the clamping mechanism. Each awl 114 includes a power cylinder 116 having a piston rod 118 and an awling pin 120 mounted at the outer end of piston rod 118. The awls 114 are carried on a rotary spider 122, the hub-portion of which is rigidly connected to the upper end of sleeve 96 surrounding center post 90. Sleeve 96 and spider 122 are rotatably mounted on center post 90 by means of suitable bearings 124 and 126 adjacent the upper and lower ends, respectively, of sleeve 96. A thrust bearing 128 is provided at the base of sleeve 96 where it is supported by the bottom plate 58 of the awling machine.

Each awl 114 is also mounted on spider 122 for radial movement thereon. To this end, power cylinder 116 is bolted at its upper end to a cross plate 130 at the top of a box-shaped mounting bracket 132, which supports each awling cylinder 116 within a radial slot 134 in each of the legs 136 of the rotary spider 122. Longitudinally grooved tracks 138 are provided on the upper side of spider 122 along opposite sides of each slot 134. Outwardly projecting tongues 140 are formed along the lower edges of mounting bracket 132 for sliding engagement within tracks 138, thereby rendering each awl 114 movable radially on its supporting leg 136. Awls 114 are moved in and out radially by six power cylinders 142, each of which is mounted radially of spider 122 at the outer end of each of its legs 136, with its piston rod 143 fastened to the mounting bracket 132 of each awl 114.

In order to position awls 114 radially so that they awl the tire at the desired distance from its inner edge, each of the mounting brackets 132 is provided with a horizontally extending stop-yoke 144, which engages a positioning leg 146 projecting downward from each of the clamping dogs 78. Since the awls do not operate until after the tire is clamped by dogs 78 to the awling platform, the clamping dogs are in engagement with the bead of the tire at the time that awls 114 are moved into engagement with positioning legs 146. The awls will therefore always be located a predetermined distance radially from the bead of the tire when their cylinders 116 are actuated to drive the awling points 120 upward into the sidewall of the tire. Because the awls 114 are at certain times located directly below clamping dogs 78, as shown in the full-line positions in the drawings, an opening 148 is provided vertically through the base portion 104 of each clamping dog, so that the piston rod 118 of each awl can pass up through the clamping dog into engagement with the tire (FIG. 5).

Figure 8:
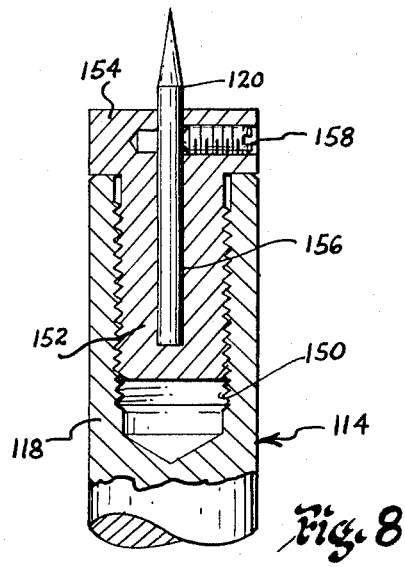
FIG. 8 is an enlarged longitudinal section of one of the awls.

As may be seen in FIG. 8, awling pins 120 are replaceably mounted in the ends of piston rods 118 so that in the event any of the pins are broken or worn they can be easily replaced. Moreover, if it is desired to awl completely through the wall of the tire, longer awling pins may be used in place of the pins shown. Each awling pin 120 is mounted in a threaded bore 150 extending longitudinally into the upper end of each piston rod 118. An externally threaded pin-holder 152 is threaded into the bore 150 until its hexagonal head 154 seats on the end of the piston rod 118. Pin holder 152 is provided with an elongated central bore 156, into which the awling pin 120 fits closely. A set screw 158 is provided in the head 154 of the pin-holder for fixing awling pin 120 in place so that its pointed end projects the desired distance above the head of holder 152. Consequently when pins 120 are driven into the wall of the tire, they penetrate only to the depth permitted by the head 154 of pin-holder 152 which engages the surface of the tire.

Referring now more particularly to FIGS. 3 and 4, it will be seen that awls 114 are positioned in a circumferential direction by a crank arm 160, which is rigidly fastened by its hub 162 to the central sleeve 96, on which spider 122 is rotatably supported. Crank arm 160, which is located just above the bottom plate 58 of the machine and moves parallel thereto, is a large yoke-shaped member having two diverging side arms extending outwardly from its hub 162 and connected at their outer ends by an arcuate cross-piece 164. A pair of power cylinders 166 and 168 are rigidly secured together at their closed ends with Piston rod 170 of cylinder 166 is connected to the outer end of crank arm 160, and piston rod 172 of cylinder 168 is in turn connected to a mounting flange 174 at one side of bottom plate 58. Cylinders 166 and 168 are supported at the center on a bearing plate 176, on which they are free to slide.

After awls 114 form the initial set of holes in the tire with each awl moved inwardly so that its stop-yoke 144 engages the positioning leg 146 of one of the clamping dogs 78 (FIG. 5), they are drawn outward by cylinders 142, and spider 122 is then rotated by extending the piston rod 170 of awl-rotating cylinder 166 to the full length of its stroke. This swings crank arm 160 clockwise, as viewed in FIG. 3, through 20° of rotation, moving the six awls 114 from the position indicated by the Roman numeral "I" adjacent the end of the full-line showing of power cylinder 142 to the broken-line position of cylinder 142 marked "II." At this point the awls are again moved in against clamping dogs 78, and the driving cylinders 116 of awls 114 are actuated a second time, in order to simultaneously awl six more holes in the tire. The awls are then moved out away from the clamping dogs, and the piston rod 172 of awl-rotating cylinder 168 is extended fully, rotating spider 122 another 20° to the broken-line position marked "III" for cylinder 142. After the awling cycle is repeated a third time, the two cylinders 166 and 168 retract simultaneously to return the awls to their initial positions.

Figure 9:
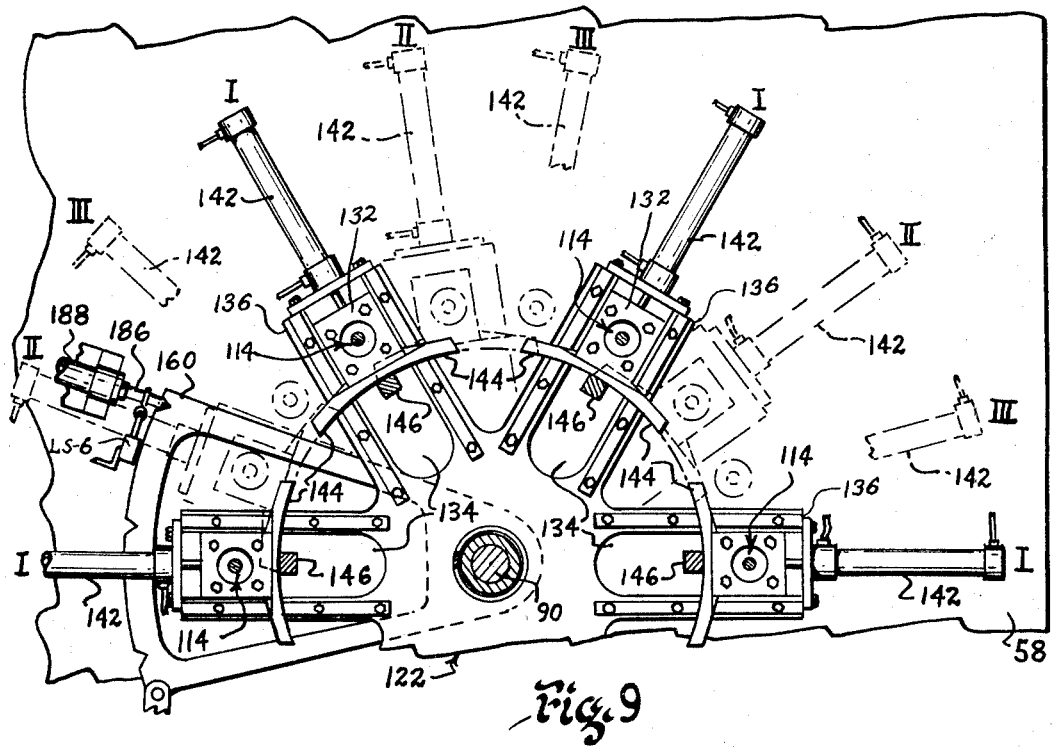
FIG. 9 is a horizontal view partly in section taken on the line 9—9 of FIG. 5.

As may be seen in FIG. 9, stop-yokes 144 spread laterally a sufficient distance such that when the awls 114 are indexed to position II, one end of each stop-yoke will still engage the positioning leg 146 of the clamping dog 78 with which it is centered when in position I. When the awling spider 122 is indexed again to position III, the opposite end of each stop-yoke 144 then becomes aligned radially with an adjacent clamping dog for engagement with its positioning leg 146. It should be noted that the tires are awled at the desired distance from the bead regardless of the size of the tire, due to the fact that the clamping dogs 78 act as radial positioners for the awls 114. If it is desired to change the distance outward of the bead at which the tires are awled, it is only necessary to adjust or replace the stop-yokes 144 at the upper end of each awling assembly 114.

Radial slots 178 and 180 are provided in clamping-dog mounting plate 82 intermediate slots 108 at 20° intervals in order to permit awls 114 to project up into engagement with the tire. Similarly spaced slots 182 and 184 are provided in the awling platform 42 in vertical alignment with the corresponding slots 178 and 180 for the same purpose. In order to ensure proper alignment of awls 114 with the slots 108, 178 and 180 in the clamping-dog mounting plate 82 and with slots 80, 182 and 184, respectively, in the awling platform, a locking lug 186 is driven by a power cylinder 188 into engagement with equally spaced notches 190, 192 and 194, respectively, on the outer edge of the arcuate cross-piece 164 on crank arm 160. Locking lug 186 is mounted on the end of the piston rod of cylinder 188, and prevents rotation of crank arm 160 whenever it is driven into one of the notches by cylinder 188. When locking lug 186 engages notch 190, awls 114 are located in their initial awling position I, whereas when lug 186 engages notches 192 and 194, respectively, the awls are located in their respective awling positions II and III.

A flange 196 on indexing lug 186 engages the operating lever of a safety switch LS-6 only when the locking lug is fully engaged in one of the notches 190, 192, and 194. As will be more apparent hereinafter, engagement of switch LS-6 by the flange 196 sets up a control circuit for actuating the awls 114. If the awls are not properly aligned with the openings in the plate 82 and platform 42, locking lug 186 can not extend far enough for its flange 196 to close LS-6, thus preventing actuation of the awls.

During the last of the three awling operations just described, a take-away carriage 200 (FIG. 2) moves into position over the tire on the awling platform so as to move the tire from the awling machine 12 onto the inverting table 14. Take-away carriage 200 rides on tracks 46 in the same manner as the feed carriage 44 which, except when actually feeding a new tire into the machine, is located over the feed ramp 10. Like the feed carriage 44, take-away carriage 200 has a push rod 202 which can be lowered by a vertically disposed air cylinder 204 into the center of the tire on the awling platform in order to move it to the inverting table.

Carriage 200 is driven back and forth on tracks 46 by a pair of horizontally disposed pneumatic cylinders 206 and 208. Cylinder 206 is mounted on a horizontal cross beam 210 which, together with the vertical supports 212, form a fixed part of the supporting structure for tracks 46 adjacent the take-away ramp 16. The piston rod 214 of cylinder 206 extends through an opening in cross beam 210 and is connected to an upright 216 on an auxiliary carriage 218 which also rides on tracks 46 in line with carriage 200. When piston rod 214 is fully extended, carriages 200 and 218 are moved to the broken-line position shown in FIG. 2 where push rod 202 is located over the inverting table 14.

The cylinder 208 of the take-away carriage is mounted on and moves with the auxiliary carriage 218. The end of a piston rod 220 of cylinder 208 is connected to carriage 200, so that upon extension of rod 220 the carriage 200 is moved away from the auxiliary carriage 218. Thus, carriage 200 may be driven by cylinder 208 from the broken-line position shown in FIG. 2 to a position over the awling platform 42 corresponding to that taken by feed carriage 44 when it delivers a fresh tire to the awling machine. Consequently, as the last awling operation is being completed on the tire on the awling platform, as described hereinbefore, the piston rods of both cylinders 206 and 208 of the take-away mechanism are extended as far as they will go, so that take-away carriage 200 is in position to insert its push rod into the opening in the tire on the awling platform.

Upon completion of the awling operations on one side of the tire, the clamping dogs 78 move up and inward to release the tire, and centering arms 50, 52 retract out to the edge of the awling platform away from the tire. At the same time push rod 202 is lowered into the opening of the tire. Clamping dogs 78 are then retracted below the platform 42, and the awling spider 122 rotated back to its initial position in order to return awls 114 to their initial position I, as shown in FIG. 3. Piston rod 220 of take-away cylinder 208 is then retracted, causing carriage 200 to move to its broken-line position shown in FIG. 2, drawing the tire onto the inverting table. At this point push rod 202 is raised out of the opening in the tire, and take-away carriage 200 moves to its full-line position by retraction of piston rod 214 of cylinder 206.

As the take-away carriage 200 is moving out of the way, a pair of clamping jaws 224 mounted under the top surface of inverting table 14 are projected upward by a power cylinder 226 into the opening of the tire, and then moved outward by horizontal cylinders 228, 228 against the bead of the tire. In order to hold the tire on the inverting table while it is being turned over, the jaws 224 are moved back so that the hooks at their upper ends engage the upper bead of the tire and draw it down against the top of the table. Cylinders 226 and 228 are suitably mounted on the inverting table 14 and are a unitary part thereof.

As soon as the tire is clamped to the inverting table, a pair of rotary power cylinders 230 at each end of a pivot shaft 232 for the inverting table are actuated in a direction to swing table 14 counterclockwise as viewed in FIG. 2 about shaft 232. When the inverting table 14 has completed a 180° swing so that the tire is located above the awling platform 42 where the free end of a positive rest 234 engages the top of the awling table, the now inverted tire is released by jaws 224. The tire drops onto the awling platform 42 where it is immediately centered by arms 50, 52 and awled on the opposite side in the same manner as before.

While the opposite side of the tire is being awled, the inverting table 14 returns in a clockwise direction to its full-line position as shown in FIG. 2. In order to balance the great weight of the inverting table for the purpose of reducing the load on rotary cylinders 230, a large counterweight 236 is mounted at the end of a long arm 238, which is attached to the inverting table but extends in the opposite direction from pivot shaft 232. Arm 238 and weight 236 swing under the pivot shaft 232 as indicated in the broken-line position shown in FIG. 2.

As the final awling operations are being completed on the second side of the same tire, the take-away carriage 200 again moves into position over the awling table 12. Then, as soon as the clamping dogs 78 again release the tire, push rod 202 is lowered into the tire, and both cylinders 206 and 208 of the take-away carriage are reversed, causing it to draw the now completely awled tire across the inverting table 14 onto the take-away ramp 16 which carries it away from the machine.

Figure 11:
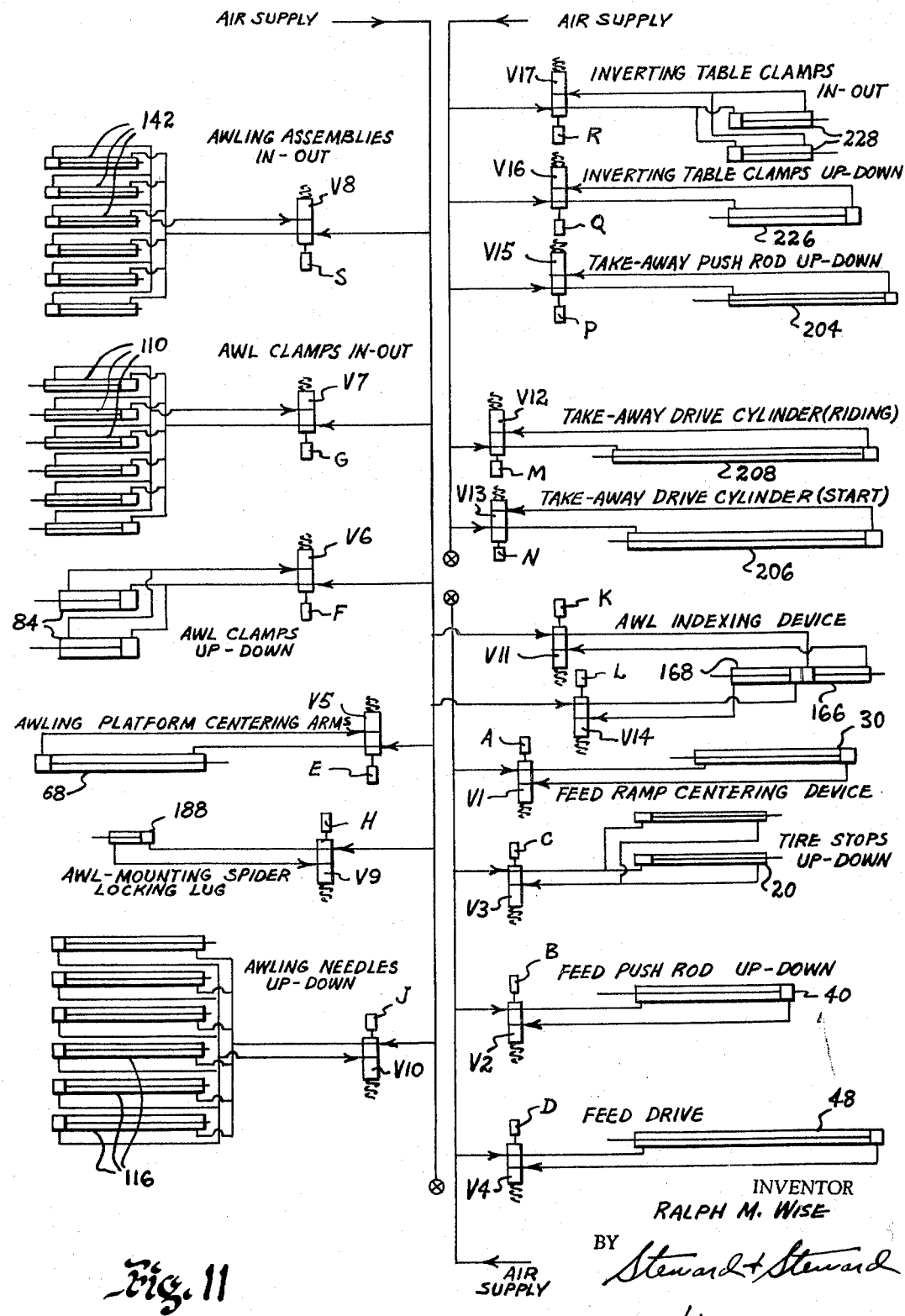
FIG. 11 is a piping diagram of the pneumatic control system.
Figure 12:
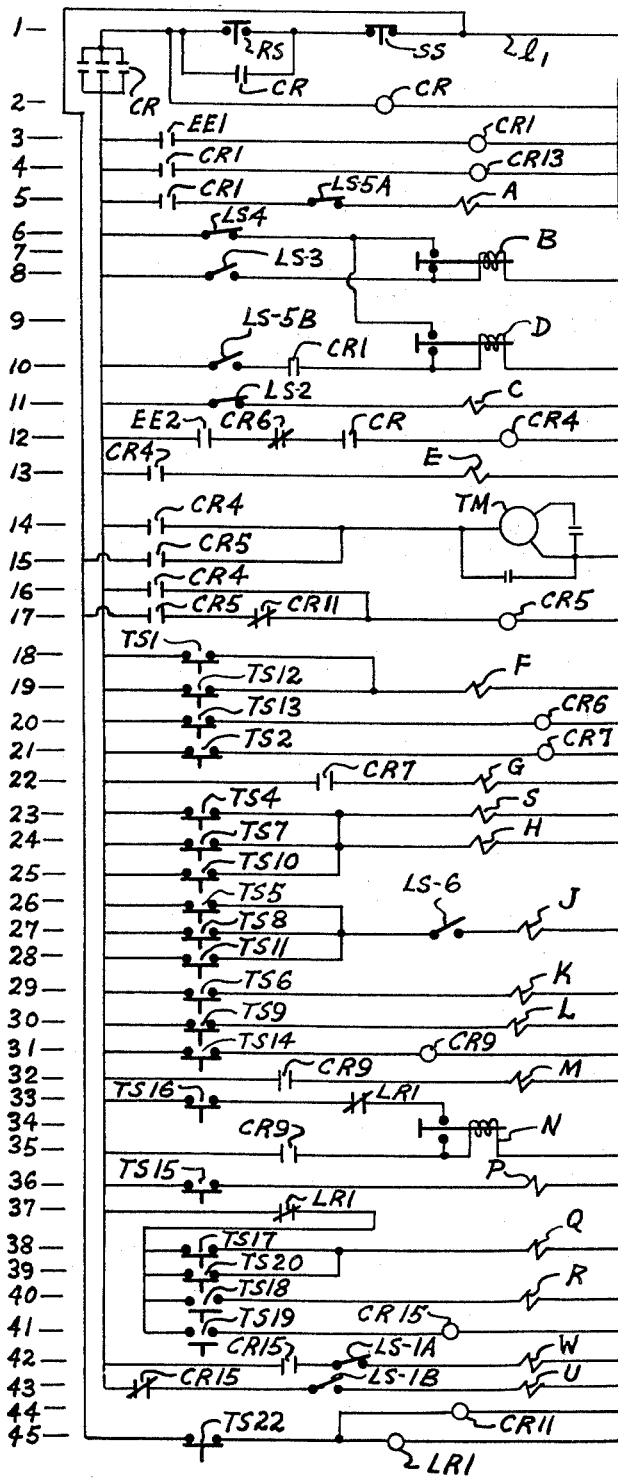
FIG. 12 is a wiring diagram of the electrical control system.
Figure 13:
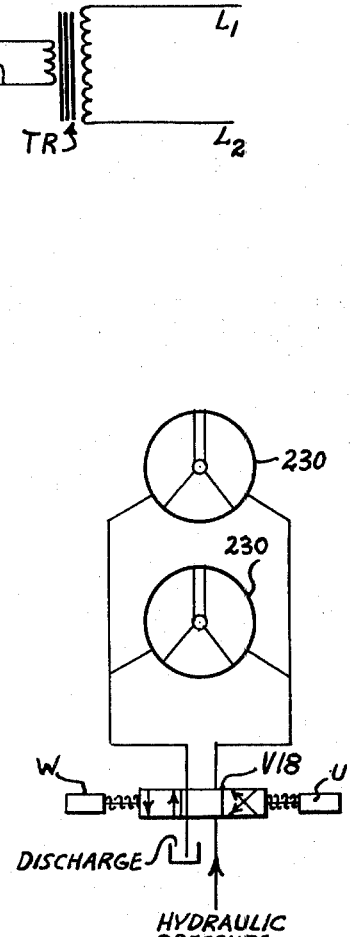
FIG. 13 is a piping diagram of the hydraulic system for the power cylinders for the inverting table.

The pneumatic system for operating the various air cylinders is shown schematically in FIG. 11, the hydraulic system for the inverting cylinders in FIG. 13, and the electrical controls therefor in FIG. 12. It will be understood of course that the entire machine could be powered hydraulically, if desired.

Referring to FIG. 12, the lines running horizontally of the wiring diagram are numbered consecutively from top to bottom for ease in locating the circuits referred to herein. Main power leads $L_1$ and $L_2$ supply electrical current to a transformer TR, across the secondary of which are connected the various control circuits, leads $l_1$ and $l_2$ being connected directly to the secondary of the transformer. Suitable main switches (not shown) in the power leads $L_1$ and $L_2$ and the secondary leads $l_1$ and $l_2$ may be provided in accordance with standard practice. A reset switch RS and a stop switch SS (line 1) are provided in lead $l_1$ for resetting the machine after a shutdown and for manually stopping the machine if necessary. A series of safety switches (not shown) can also be provided in the lead $l_1$ to ensure that the various parts of the machine are properly reset before the machine can be started and for stopping the machine in case of a malfunction. Assuming that these safety switches are closed, when the machine is ready to run, reset switch RS is actuated manually, energizing a control relay CR (line 2), which closes contacts CR (lines 1 and 2) for energizing the control circuits. At the same time contacts CR in a holding circuit around reset switch RS are also closed, in order to maintain power to the control circuits during normal operation of the machine.

When a tire rolls down feed ramp 10 against stops 18, 18, contact EE1 (line 3) are closed due to the fact that the light beam for the photoelectric control relay EE1 is interrupted by the tire. This energizes a control relay CR1, which closes contacts CR1 at line 5, energizing a solenoid A of an air reversing valve V1 (FIG. 11) for the tire centering cylinder 30 at feed ramp 10, in order to center the tire thereon. Operation of the centering device 22 momentarily closes limit switch LS-3, which is spring-loaded to the open position, energizing a solenoid B of a valve V2 (FIG. 11) for reversing the air to cylinder 40 so as to lower push rod 38 into the tire. When solenoid B is energized, it completes a holding circuit through normally closed limit switch LS-4 (line 6), so that LS-3 may open without de-energizing solenoid B.

Limit switch LS-2 (line 11), which is actuated when push rod 38 is lowered, is spring-loaded to the closed position, so that a solenoid C in an air valve V3 controlling cylinders 20, 20 of stops 18, 18 is energized as soon as control relay CR (line 2) is energized, thereby raising stops 18, 18 in order to block entry of tires to the awling machine 12. Opening of LS-2, when push rod 38 is lowered, reverses valve V3, in order to lower stops 18, 18 out of the way, allowing the tire to be pushed onto the awling platform. When stops 18, 18 retract they open a normally closed limit switch LS-5A (line 5) and close a normally open limit switch LS-5B (line 10). This de-energizes solenoid A, retracting the centering device 22, and energizes a solenoid D in an air valve V4 of the cylinder 48 which moves the feed carriage 44 in order to push the tire onto the awling platform. Solenoid D is energized when LS-5B closes because the contacts CR1 in this circuit are closed, control relay CR1 (line 3) being energized so long as the tire on ramp 10 breaks the light beam to the photoelectric control relay EE1. Solenoid D holds itself energized in the same manner as solenoid B by completing a holding circuit through the normally closed limit switch LS-4 (line 6). As the tire is pushed onto the awling platform, contacts EE1 open, de-energizing control relay CR1, which opens the contacts CR1 at lines 4, 5 and 10.

When the feed carriage 44 completes its forward stroke, it engages and opens limit switch LS-4, de-energizing solenoids B and D, thus raising the push rod 38 out of the tire opening and returning the feed carriage 44 to the feed ramp 10. As carriage 44 starts on its return stroke, LS-4 closes. At the same time, when push rod 38 is lifted out of the tire, it closes LS-2 (line 11) which energizes solenoid C and raises tire stops 18. Finally, as stops 18 reach their tire-blocking position, they close LS-5A and open LS-5B so that all the limit switches, control relays and solenoids are in their original conditions ready to accept the next tire as soon as the one just delivered leaves the awling machine. Suitable means (not shown) are provided for preventing delivery of a new tire to feed ramp 10 until the one in the machine is discharged onto take-away ramp 16.

When a tire is pushed onto the awling platform 42, it breaks a light beam to a photoelectric control relay EE2 (FIG. 2), which closes contacts EE2 (line 12, FIG. 12) energizing control relay CR4, thus closing contacts CR4 at lines 13, 14 and 16, in order to start a timer motor TM and to energize a solenoid E as well as a control relay CR5. Timer motor TM drives a cam-switch programmer which operates timing switches TS for sequencing the awling operations on the tire.

In this instance, the timer runs through two separate timing cycles for each complete cycle of operations required in awling a tire on both sides. Twenty cam-actuated switches of the motor-driven timer are employed. By way of example, the opening and closing of the various timing switches is tabulated in the accompanying Table A by the number of degrees of rotation at which each switch opens and closes during each 360° revolution of the timer.

TABLE A

| TS Number | Closes at— | Opens at— | TS Number | Closes at— | Opens at— |
| --- | --- | --- | --- | --- | --- |
| | Degrees | Degrees | | Degrees | Degrees |
| 1 | 0 | 20 | 12 | 148 | 156 |
| 2 | 10 | 151 | 13 | 154 | 332 |
| 4 | 26 | 54 | 14 | 110 | 158 |
| 5 | 28 | 44 | 15 | 151 | 188 |
| 6 | 57 | 171 | 16 | 18 | 200 |
| 7 | 72 | 100 | 17 | 207 | 268 |
| 8 | 74 | 90 | 18 | 232 | 319 |
| 9 | 104 | 171 | 19 | 223 | 328 |
| 10 | 120 | 147 | 20 | 312 | 331 |
| 11 | 122 | 138 | 22 | 335 | 350 |

When solenoid E is energized by the closing of contacts CR4 (line 13), it actuates a valve V5 (FIG. 11) for controlling the cylinder 68 for tire centering arms 50, 52, which thereupon move into engagement with the tire. Energization of control relay CR5 closes contacts CR5 (lines 15 and 17), so that control relay CR5 and the timer motor TM continue to be energized after contacts CR4 at lines 14 and 16 open.

As the timer motor TM starts to run, the cam-operated timing switch TS1 (line 18) closes, energizing a solenoid F which reverses a control valve V6 (FIG. 11) in the air lines to elevating cylinders 84 for raising the clamping dogs 78 into the center of the tire. TS2 (line 21) then closes, energizing a control relay CR7 (line 21) which closes contacts CR7 (line 22) in circuit with a solenoid G in a solenoid valve V7 in the air lines to cylinders 110 which move the clamping dogs 78 in and out. When solenoid G is energized by the closing of contacts CR7, the clamping dogs 78 are moved out against the lower bead of the tire. TS1 then opens de-energizing solenoid F in order to reverse valve V6, which lowers the clamping dogs onto the bead of the tire, holding it firmly against the platform 42 of the awling machine 12.

A timing switch TS4 (line 23) then closes energizing a solenoid S in a solenoid valve V8 (FIG. 11) in the air lines to cylinders 142 which move the awls 114 into and out of engagement with the clamping dogs 78. Energization of solenoid S causes the awls to be moved in against the dogs. At the same time, a solenoid H is also energized, solenoid H being located in a valve V9 in the air lines to the locking cylinder 188 which drives locking lug 186 into the notches in the crank arm 160 by which the awls are indexed from one position to the next (see FIG. 3). Provided the awls are properly lined up in position I, limit switch LS–6 (line 27 of FIG. 12) will be closed by the flange 196 on locking lug 186, as the end of lug 186 is driven into the locking notch 190. If the awls are not properly indexed, LS–6 will not close, preventing actuation of the awls at a time when they are not aligned with the openings in the mounting plate 82, the awling platform 42, and in this case with the holes 148 in the clamping dogs 78. Damage to the awls is thereby avoided.

A timing switch TS5 (line 26, FIG. 12) is then closed by the timer in order to energize a solenoid J in a valve V10 (FIG. 11) for the awling cylinders 116, reversing the air to these cylinders which drive awling pins 120 into the sidewall of the tire as shown in FIG. 5. TS5 opens immediately thereafter, de-energizing solenoid J and retracting the awls to the position shown in FIG. 4. The timing switch TS4 then opens in order to de-energize solenoid H, withdrawing locking lug 186 from the notch 190, which causes LS–6 to open. The opening of TS4 also de-energizes solenoid S, causing the awl assemblies 114 to move radially outward away from clamping dogs 78.

As the timer motor TM continues to run, a timing switch TS6 (line 29, FIG. 12) closes, energizing a solenoid K, which reverses an air valve V11 (FIG. 11) in the air lines to awl-indexing cylinder 166, extending its piston rod 170 until notch 192 is aligned with locking lug 186 where awling assemblies 114 are then located in position II. At this point, a timing switch TS7 (line 24) closes, again energizing solenoids H and S, in order to drive locking lug 186 into the notch 192 in cross-piece 164 to ensure proper indexing of the awls, while at the same time awling assemblies 114 are again moved in against clamping dogs 78 so that they will be correctly positioned radially of the tire. A timing switch TS8 (line 27) then closes energizing solenoid J (provided LS–6 has been closed by locking lug 186), in order to awl the second set of holes in the same side of the tire. TS8 opens shortly thereafter in order to retract the awls again.

Upon retraction of the awls after the tire has been awled the second time, TS7 opens in order to unlock the crank arm 160 and to move the awling assemblies 114 outward again away from the clamping dogs 78, so that the spider 122 on which the awls are mounted can be indexed again to position III. This is accomplished by closing of a timing switch TS9, which energizes a solenoid L (line 30) in a valve V14 for the awl-indexing cylinder 168, causing its piston rod to extend to its full limit and rotating the awling assemblies until locking notch 194 on the crank arm 160 is aligned with locking lug 186. A timing switch TS10 (line 25) then closes energizing solenoids H and S in order to lock the spider 122 in position III and to move the awling assemblies 114 in against clamping dogs 78. A timing switch TS11 (line 28) in the circuit for solenoid J then closes long enough to drive the awls into the tire again for the third and last time. Upon opening of timing switch TS11, de-energizing solenoid J, the awling pins 120 are retracted, and TS10 opens in order to unlock the awl-supporting spider 122 and to move the awling assemblies away from the clamping dogs 78.

During the third awling operation, a timing switch TS14 (line 31) closes, energizing a control relay CR9, which in turn energizes solenoids M (line 32) and N (line 34) by closing contacts CR9 in circuits thereto. Solenoid M is located in an air valve V12 (FIG. 11) controlling cylinder 208 on the take-way carriage 218 (FIG. 1), while solenoid N is in an air valve V13 which controls take-away carriage drive cylinder 206. Energization of these two solenoids initiates extension of the piston rods 214 and 220 of both cylinders 206 and 208, so that by the time the tire has been awled for the third time take-away carriage 200 will be in position to remove the tire from awling platform 42.

Upon completion of the third awling operation on the tire, a timing switch TS12 (line 19) closes, again energizing solenoid F in the control valve V6 for the clamping dog elevating cylinders 84, thereby raising the clamping dogs 78 away from the lower bead of the tire. Timing switch TS2 (line 21) which has been closed since early in the timer cycle, now opens de-energizing control relay CR7 in order to open contacts CR7 de-energizing solenoid G, which causes the clamping dogs 78 to draw inwardly away from the bead of the tire. At the same time a timing switch TS13 (line 20) closes, energizing a control relay CR6 which opens normally closed contacts CR6 at line 12 in the circuit to control relay CR4. Control relay CR4 is therefore de-energized causing contacts CR4 at lines 13, 14 and 16 to open. Solenoid E, which controls the centering arms 50, 52 on the awling platform, is de-energized upon opening contacts CR4 (line 13), and the centering arms therefore retract from the tire. It will be noted that the opening of contacts CR4 in the circuits at lines 14 and 16 does not stop the running of timer motor TM or de-energize the control relay CR5, because contacts CR5 (lines 15 and 17) and CR11 (line 17) are closed.

Timing switch TS12 in the circuit with solenoid F for the clamping dog elevating cylinders 84 now opens in order to retract the clamping dogs 78 downward until they are flush with the top of platform 42, so that the tire is free to be moved off the awling platform. A timing switch TS15 (line 36) closes at about the same time as the opening of TS12, in order to energize a solenoid P in an air valve V15 for the push rod cylinder 204, thus lowering the push rod 202 of the take-away carriage 200. Since carriage 200 is by now located above the tire on the awling platform, both driving cylinders 206 and 208 having fully extended after solenoids M and N were energized when TS14 (line 31) closed, the end of push rod 202 drops into the opening of the tire, so that it can drag the tire off the awling platform onto the inverting table 14.

With the clamping dogs 78 and centering arms 50, 52 of the awling machine out of the way, the tire is free to be moved onto the inverting table 14. This is accomplished by the opening of TS14 in the timer, which de-energizes control relay CR9 and, therefore, solenoid M for the cylinder 208, causing the carriage 200 to move from the awling machine to the inverting table, and carrying the tire with it. The awls 114 are then indexed back to their initial position I by the opening of timing switches TS6 and TS9, which de-energizes the solenoids K and L for the two cylinders 166 and 168 that are mounted in tandem, causing the piston rods for both of these cylinders to retract simultaneously in order to rotate the spider 122 back to its original position.

It should be noted that when control relay CR9 is de-energized by the opening of TS14, the resulting opening of contacts CR9 at line 35 does not de-energize the solenoid N for the other drive cylinder 206 in the take-away conveyor because the solenoid N is of the circuit-holding type like solenoids B and D used in the feeding system. Thus, when solenoid N is energized it completes a holding circuit through a previously closed timing switch TS16 (line 33) and a normally closed contact LR1. As will be seen in Table A TS16 closed early in the cycle. Moreover, since latch relay LR1 (line 45) has not yet been energized, contacts LR1 are also closed. Consequently, when solenoid N was energized by the closing of contacts CR9 (line 35) upon the closing of TS14 (line 31) for the purpose of moving the take-away carriage into position over the awling platform 42, its holding circuit was also completed through TS16 and LR1, so that solenoid N would still be energized when contacts CR9 (line 35) open simultaneously with the opening of contacts CR9 at line 32 in order to reverse take-away cylinder 208. Therefore, at this point in the cycle of operations, the take-away carriage 200 moves only from the awling machine 12 to the inverting table 14, where it stops momentarily to permit its push rod 202 to be raised out of the tire as it rests on the inverting table.

It will be noted that when the tire leaves the awling platform 42, the light beam to the photoelectric relay EE2 is re-established, so that contacts EE2 (line 12) open, breaking the circuit to control relay CR4 and opening contacts CR4 at lines 14 and 16. However, power to the timer motor TM is not interrupted because contacts CR5 (line 15) remain closed, due to the fact that normally closed contacts CR11 (line 17) in a control relay CR11 (line 44) keep the control relay CR5 (line 17) energized.

As soon as the carriage 200 reaches the position over the inverting table 14 (shown in broken lines in FIG. 2), timing switch TS15 opens, de-energizing solenoid P so as to lift push rod 202 out of the opening in the tire. The timing switch TS16 then opens, de-energizing solenoid N in order to fully retract take-away carriage 200 to its full-line position to the right, as shown in FIG. 2, by means of drive cylinder 206. The tire is thus left on the inverting table 14.

Immediately upon delivery of the tire onto the inverting table, a timing switch TS17 (line 38) closes in order to energize a solenoid Q for reversing a valve V16 in the air lines to the cylinder 226, thereby raising the inverting table clamping jaws 224 into the center of the tire. A timing switch TS19 (line 41) then closes, energizing a control relay CR15, which closes contacts CR15 (line 42) and opens normally closed contacts CR15 (line 43). As contacts CR15 (line 42) close, the rotary cylinders 230 on the pivot shaft 232 begin to rotate the inverting table upward due to energization of a solenoid W in a 4-way, 3-position, spring centering control valve V18 (FIG. 13), which directs hydraulic fluid to one side of each of the rotary cylinders from a supply pump (not shown). In order to hold the tire against the top of the inverting table 14 as it swings back over the awling platform 42, the clamping jaws 224 are moved outward against the beads of the tire and then lowered so that their outwardly projecting nose-portions engage the top of the upper bead. This is effected by the closing of a timing switch TS18 (line 40) which energizes a solenoid R in a valve V17 (FIG. 11), reversing cylinders 228 thereby moving the jaws outward. Then TS17 opens de-energizing solenoid Q and lowering the jaws.

Shortly after the inverting table 14 starts to swing upward about pivot shaft 232, it engages and closes a normally open limit switch LS-1B (line 43) in a circuit to a solenoid U for reversing the control valve V18 for inverting cylinders 230. However, since control relay CR15 is now energized due to the fact that TS19 is closed, contacts CR15 (line 43) are open and solenoid U therefore remains de-energized while the tire is being inverted. When the inverting table is almost all the way over, it engages and opens a normally closed limit switch LS-1A (line 42) which opens the circuit to solenoid W permitting the spring-loaded valve V18 to return to its neutral position, preventing the inverting table from slamming down against the awling platform 42.

With the tire now held above awling platform by the inverting table, a timing switch TS20 (line 39) closes, re-energizing solenoid Q in order to raise clamping jaws 224. Almost immediately thereafter TS18 (line 40) opens de-energizing solenoid R, which moves the clamping jaws inward. This releases the tire permitting it to drop onto the awling platform. TS19 then opens, de-energizing control relay CR15 which opens contacts CR15 (line 42) and closes contacts CR15 (line 43). Since LS-1B is closed, the closing of CR15 (line 43) completes a circuit to solenoid U, which actuates the inverting cylinders 230 in the opposite direction in order to return the inverting table 14 to its original position. Shortly after the inverting table starts to return, TS20 opens de-energizing solenoid Q in order to return the clamping jaws 224 flush with the top of the inverting table.

At this point, TS13 (line 20) opens, de-energizing control relay CR6 which permits the contacts CR6 at line 12 to close. Control relay CR4 is therefore re-energized, due to the fact that contacts EE2 are closed, the tire having been inverted and deposited on awling platform 42 where it again breaks the light beam to photoelectric relay EE2. Consequently, contacts CR4 (line 13) close, energizing solenoid E so that the tire will be centered again on the awling platform. In addition, contacts CR4 at lines 14 and 16 of FIG. 12 likewise close, in order to keep the timer motor TM running and the control relay CR5 (line 17) energized when normally closed contacts CR11 open.

When the inverting table is almost all the way back, limit switch LS-1B (line 43) opens, de-energizing solenoid U so that control valve V18 returns to its neutral position, preventing the inverting table from slamming back down on its mounts. The weight of the inverting table then forces it into place on its mounts. While the inverting table 14 is returning, but after TS13 (line 20) opens, a timing switch TS22 (line 45) closes completing a circuit to the control relay CR11 and the latch relay LR1 at lines 44 and 45 of FIG. 12. When control relay CR11 is energized by the closing of TS22, contacts CR11 (line 17) open, but control relay CR5 stays energized due to the fact that contacts CR4 (line 16) were closed upon opening of TS13 while a tire is on the awling platform. Consequently, contacts CR5 (line 15) remain closed, furnishing power to the timer motor TM, which continues to drive the timer past its "start" position.

When latch relay LR1 is energized by the closing of TS22, its initially closed contacts LR1 at lines 33 and 37 become latched open until latch relay LR1 is again energized. The holding circuit for solenoid N, which controls the take-away drive cylinder 206, is therefore de-activated until TS22 is closed a second time. As a result, both drive cylinders 206 and 208 of the take-away device will retract during the second cycle of the timer, which continues to run in order to program the awling operations on the second side of the tire. Likewise, contacts LR1 (line 37) cut off power to solenoids Q and R and control relay CR15 at lines 38 through 41, in order to de-activate the inverting table 14 so that the tire can be drawn across table 14 onto the take-away ramp 16 when the second side of the tire has been awled.

Just before the timer completes its first cycle, TS22 opens de-energizing control relay CR11 (line 44), which permits contacts CR11 (line 17) to close again, but this does not energize control relay CR5 because contacts CR5 (line 17) are open. Similarly, when TS22 opens de-energizing latch relay LR1, contacts LR1 (lines 33 and 37) do not close, because they are latched open until latch relay LR1 is again energized.

As just described hereinabove, timer motor TM continues to drive the programmer past its start position, closing TS1 (line 18) and repeating the operations of clamping the tire to the awling platform, awling it, indexing the awls through 20° of rotation, awling the tire again, indexing the awls through another 20° of rotation, awling the tire a third time and then releasing the tire and rotating the awls back to their initial position. This completes the awling operations on both sides of the same tire. With the clamping dogs 78 retracted flush with the top of platform 42 and with the centering arms 50, 52 moved away from the tire, the awled tire is ready to be discharged to the take-away ramp 16.

At this point in the cycle of the cam-switch timer, TS12 has just opened in order to lower the clamping dogs 78, and TS6, 9, 13, 14, 15 and 16 are still closed. TS14 (line 31) then opens, de-energizing control relay CR9, which opens contacts CR9 (lines 32 and 35), de-energizing both solenoids M and N of the take-away cylinders 206 and 208, causing them to retract simultaneously so as to pull the awled tire across the inverting table and onto ramp 16. As mentioned hereinbefore, solenoid N is de-energized when the tire is removed from the awling platform after being awled on its second side, whereas solenoid N did not de-energize after the tire had been awled on only one side. This is due to the fact that latch contact LR1 is now open, so that the holding circuit for solenoid N can not be completed. TS6 (line 29) and TS9 (line 30) now open in order to de-energize the solenoids K and L which reverse indexing cylinders 166 and 168 in order to rotate the awls back to their initial positions.

After the awled tire reaches the take-away ramp 16, TS15 (line 36) opens de-energizing solenoid P which raises the push rod 202 out of the center of the tire, permitting it to roll down the ramp where it breaks a beam to another photoelectric cell (not shown), in order to start feed conveyor 17. Another tire will then be fed to ramp 10 where it breaks the light beam to photoelectric relay EE1 which initiates the centering and feeding operations prior to entry of the second tire to the awling machine 12.

As the awled tire leaves the awling machine, and while the next tire is being fed to it, the timer motor TM continues to run, actuating the remainder of the timing switches at the end of its timing cycle. However, none of the inverting operations are performed because power to their control circuits at lines 38 through 41 of FIG. 12 is cut off by latch contacts LR1 (line 37) which are open. Furthermore, this time when TS13 (line 20) opens, the closing of contacts CR6 (line 12) does not energize solenoid CR4, because no tire is on the awling platform and, therefore, the contacts EE2 in line 12 are not closed. The contacts CR4 (lines 14 and 16) in the circuits for the timer motor TM are therefore not closed. Consequently, when TS22 closes just before the end of the cycle and energizes control relay CR11 (line 44), opening contacts CR11 (line 17), power to the timer motor TM is cut off and the awling cycle is completed. It will be noted that contacts LR1 (lines 33 and 37) of the latch relay LR1 are reset to their original closed positions when TS22 closes. Furthermore, while the timer may not completely finish its second cycle after TS22 closes, de-energizing the timer motor, the only switch still to be operated before the beginning of the next cycle is the opening of TS22. However, this only means that the control relay CR11 and latch relay LR1 remain energized until the timer motor is started again at the beginning of the next awling cycle when the next tire to enter the awling machine breaks the beam for the photoelectric relay EE2. Energization of control relay CR11 and latch relay LR1 has no effect on the starting of the timer during the next cycle of operations, and they are immediately de-energized when the timer motor TM starts again on entry of a new tire to the awling machine.

Delivery of a new tire to the feed ramp 10 starts a completely new cycle of operations as the photoelectric relay EE1 closes contacts EE1. The machine will therefore continue to operate automatically so long as tires are fed to it by feed conveyor 17.

It will be apparent from the foregoing description and from FIG. 11 of the drawings that the solenoid valves employed for controlling the air cylinders are each spring-loaded in one direction, so that when their solenoids are de-energized they return to their initial positions. The hydraulic valve V18 for the inverting cylinders 230, on the other hand, is spring-loaded to a neutral position, so that upon de-energization of either of its solenoids the inverting cylinders simply stop instead of reversing.

What is claimed is:
1. Tire awling apparatus comprising in combination,
 (a) an awling platform disposed for engagement with the side of a tire centered with respect thereto, said platform having a central axis extending perpendicular to the plane of said tire and through the center thereof,
 (b) a plurality of tire clamping members mounted on said platform adjacent the opening circumscribed by said tire and disposed in spaced relation to each other about said central axis,
 (c) means for moving said clamping members axially into the opening in the tire, radially outward against the inner edge thereof and axially back into clamping engagement therewith whereby the bead portion of the tire is clamped to said platform,
 (d) a plurality of awls disposed about said central axis and mounted independently of said clamping members for movement radially of the tire,
 (e) means for moving said awls radially into engagement with said clamping members for radially positioning said awls when the tire is clamped to said platform by said clamping members, and
 (f) means for driving said awls into said tire while it is clamped thereto in order to perforate the tire at spaced intervals about said central axis and at predetermined distances from its inner edge.

2. Tire awling apparatus as set forth in claim 1, wherein said awls are mounted for step-by-step rotary movement about said central axis, and which further includes means for rotating said awls a predetermined amount about said central axis in order to perforate the side of the tire at spaced intervals from the perforations initially made by said awls.

3. Tire awling apparatus as set forth in claim 2, wherein said tire clamping members are mounted on a mounting plate disposed parallel to said awling platform and movable toward and away therefrom, said clamping members being movable on said mounting plate radially of said central axis, said awls being mounted for radial movement on a rotatable spider whose axis of rotation coincides with said central axis, and positioning means disposed on each of said awls and clamping members, respectively, for cooperating engagement with each other when said awls are moved into engagement with said clamping members, said positioning means being formed so as to engage at any rotary position of said awls relative to said clamping members.

4. Tire awling apparatus as set forth in claim 2, which further includes means for locking said awls at predetermined points in their step-by-step rotary movement.

5. A method of awling a tire, which comprises the steps of:
 (a) clamping the inner edge of one side of the tire to a supporting surface,
 (b) simultaneously perforating said side of the tire during a first perforating operation at a number of points equally spaced from each other in a circumferential direction and adjacent the inner edge of the tire, and
 (c) perforating said side of the tire during a second perforating operation at a similar number of points intermediate the points at which it was first perforated.

6. A method of awling a tire as defined in claim 5, which includes a further step of perforating the side of the tire during a third perforating operation at the same number of points intermediate the points at which it was previously perforated, such that all of the perforations are equally spaced circumferentially of the tire.

7. A method of awling a tire as defined in claim 6, wherein the tire is perforated at six points during each perforating operation, each of the perforations made during the second perforating operation being located 20° of arc from the first perforations, while each of the perforations made during the third perforating operation are located 20° of arc from the second perforations.

8. A method of awling a tire, which comprises the steps of:
(a) awling the tire on one side on an awling platform,
(b) moving the tire laterally from the awling platform onto an inverting table,
(c) lifting the tire bodily on the inverting table and depositing it with its other side up back onto the same awling platform, and
(d) awling the tire on its other side.

9. A tire awling apparatus comprising in combination,
(a) a horizontally disposed awling platform onto which tires are delivered on their sides,
(b) means for clamping the tire to said awling platform and for awling it on one side,
(c) take-away means for moving the tire off said awling platform to one side thereof,
(d) an inverting table disposed to one side of said awling platform for receiving the tire when it is pushed off said platform,
(e) means for clamping the tire to said inverting table while the tire is being inverted,
(f) said inverting table being mounted for pivotal movement about its edge which is adjacent said awling platform for swinging the tire clamped thereto through 180° of arc and depositing it back onto said awling platform, so that the tire can be awled on the other side, and
(g) power means for inverting said inverting table.

10. Tire awling apparatus as defined in claim 9, wherein said take-away means includes means for discharging the tire by moving it completely across said inverting table after it has been awled on both sides.

11. Tire awling apparatus as defined in claim 9 or 10, which further includes feed means for delivering tires one at a time to said awling machine after each tire has been awled on both sides.

12. Tire awling apparatus as defined in claim 11, which includes automatic control means for actuating said feed means upon discharge of a tire which has been awled on both sides, for actuating said clamping and awling means upon delivery of a tire onto said awling platform, for actuating said take-away means in order to move the tire from the awling platform to the inverting table, for actuating the inverting table clamping means and power means after a tire has been awled on one side, and for actuating said tire discharging means after the tire has been awled on both sides, and means effective upon each tire being inverted and deposited again on said awling platform for de-activating that portion of said control means which actuates the inverting table clamping and power means.

13. An automatic operating and control system for tire awling apparatus as defined in claim 10, which comprises a plurality of power cylinders for operating said awling table clamping and awling means, said take-away means and said inverting table clamping and inverting means; a timing device for sequencing the operations of said power cylinders from the initial awling of the tire on one side through the inverting of the tire back onto the awling platform for awling the opposite side thereof, means for recycling said timing device when the tire is inverted in order to sequence the awling operations a second time, and means for de-activating the tire inverting operations and for activating the tire discharge means of said take-away means during the recycle of said timing device.

14. Tire awling apparatus as set forth in claim 4, wherein said locking means comprises a locking bolt, said means for rotating the awls including a crank arm fixed with respect to said awls by which said awls are indexed, said locking bolt being movable into locking engagement with said crank arm, and control means cooperatively interconnecting said locking bolt and said driving means for operating said awls whereby said awls are prevented from perforating the tire unless said locking bolt is in locking engagement with said crank arm.

15. Tire awling apparatus as set forth in claim 3, which further includes means for locking said awls at predetermined points in their step-by-step rotary movement.

16. Tire awling apparatus as set forth in claim 15, wherein said locking means comprises a locking bolt, said means for rotating the awls including a crank arm fixed with respect to said awls by which said awls are indexed, said locking bolt being movable into locking engagement with said crank arm, and control means cooperatively interconnecting said locking bolt and said driving means for operating said awls whereby said awls are prevented from perforating the tire unless said locking bolt is in locking engagement with said crank arm.

References Cited

UNITED STATES PATENTS 2,561,012  7/1951  Clark.
3,109,337  11/1963  Wise _____ 83—2

JAMES M. MEISTER, *Primary Examiner.*